CHECKING CIRCUIT

Filed March 19, 1962

INVENTOR
R. L. SIMMS, JR.

BY S E Hollander

ATTORNEY

United States Patent Office 3,160,852

Patented Dec. 8, 1964

3,160,852
CHECKING CIRCUIT

Robert L. Simms, Jr., Colt's Neck, N.J., assignor to Bell Telephone Laboratories, Incorporated, New York, N.Y., a corporation of New York Filed Mar. 19, 1962, Ser. No. 180,598
11 Claims. (Cl. 340—146.1)

This invention relates to checking circuits for telephone systems and more particularly, to sequential checking arrangements which, through feedback means, permit operation by time-sequenced signals.

It is often desired in telephone and other systems to have an indication of how many paths of a group of paths are completed or how many of a plurality of conductors are energized. Similarly, checking circuits are often designed to select a certain number of paths in order to control the delivery of current to various current-sensitive devices. In addition, as an extension of this type of checking operation, several checking circuits can be arranged to check the number of operative paths in more than a single group of paths. This type of check can be utilized for several purposes, one of the leading purposes being as an error detecting arrangement.

In the past, these checks have been accomplished through such means as current monitoring devices, which detect the arrival of a certain predetermined value of current at the common output of several parallel-connected paths to be checked. This type of check is restricted in its applications however, and is often dependent on the type of load to which the current is to be delivered. For instance, current monitoring devices are not especially effective when the load is inductive because the time to reach the steady state condition may be quite long. Symmetric relay circuits have also been used to achieve this checking function, but as is well known, such arrangements usually require a great many relay contacts, thereby increasing the cost of the circuit and also reducing its speed of operation. Furthermore, many of these detecting devices are also dependent on the simultaneous completion of the paths or activation of the conductors; it will be recognized that this too is a limiting feature.

Prior art checking circuits employing relays in symmetrical arrangements are illustrated by the familiar two-out-of-five networks such as that shown on page 62 of "The Design of Switching Circuits" by Keister et al. (D. Van Nostrand Company, Inc., 1951). Such a network gives an output when any two of the five relays A through E has operated. A circuit which indicates whether or not a predetermined number of conductors in each of several groups is energized is shown in W. H. T. Holden Patent 2,484,226, issued October 11, 1949. In Holden's device, consistent with the restrictions mentioned supra, a switching element is needed for each conductor in each group to be checked.

From the above explanation, it is apparent that certain prior art checking circuits require highly complex units with the commensurate attendant expense. Moreover, despite their complexity, certain prior devices remain incapable of function when the inputs thereto were not wholly simultaneous.

It is therefore an object of this invention to provide improved checking circuits.

A further object of this invention is to provide a checking circuit which utilizes elements for time-sequenced recycling.

Another object of this invention is to provide a checking circuit whose operation is independent of the time at which the paths or conductors to be checked become energized.

It is an additional object of this invention to provide a checking circuit whose operation is independent of the type of load connected to the circuit's output.

These and other objects of this invention are achieved in one illustrative embodiment thereof wherein a two-transistor checking circuit is disclosed. The circuit checks whether, of a plurality of paths, one and only one of the paths is completed. The checking operation is divided into two time-sequenced aspects. The first part of the check indicates if at least one of the plurality of paths has been completed by turning off a normally ON output transistor. If this part of the check is successful, a pulse is fed back to turn on a second transistor which, if only a single path through the network is available, provides current to sequentially turn on the above-mentioned output transistor, thereby resulting in an output indication that only a single path has been completed. If more than one path is closed, the additional current provided by the second transistor is insufficient to turn on the output transistor; and if no paths through the network are completed, the output transistor will not turn off at all.

In another illustrative embodiment of this invention, several checking circuits of the type described above are arranged so as to provide a similar check on more than one group of paths. Through the use of logic and output devices, an indication may be furnished as to whether or not just a single path in each of the groups to be checked is available. Furthermore, this type of arrangement may be utilized to determine if at least one group of paths has either no paths completed or more than one path completed.

A feature of this invention includes a circuit which accomplishes a checking operation in two separate time-sequenced parts.

Another feature of this invention includes feedback circuitry which permits the checking arrangement to monitor sequential inputs.

An additional feature of this invention includes means for furnishing an output signal indicative of the closure condition of a group of paths to be checked.

Another feature of this invention includes facilities for balancing the current to a transistor against the current from one and only one of a plurality of paths to be checked.

A further feature of this invention is structure for energizing a selected predetermined number of relay devices whose contacts provide for the completion of a utilization circuit.

Yet another feature of this invention is a circuit arrangement to check on the path closure condition of a plurality of path groups to determine if only a predetermined number of paths is closed in each group, or if more than said predetermined number are closed in at least one group, or if less than said predetermined number are closed in any one group.

A still further feature of this invention is provision for bistable switching means to furnish a time-sequenced signal to both energize a portion of the checking arrangement and to change the state of another bistable device, should the predetermined number of paths not be closed in one or more groups.

These and other objects and features of this invention will be more readily understood with reference to the following specification, appended claims and attached drawing in which:

Figure 1:
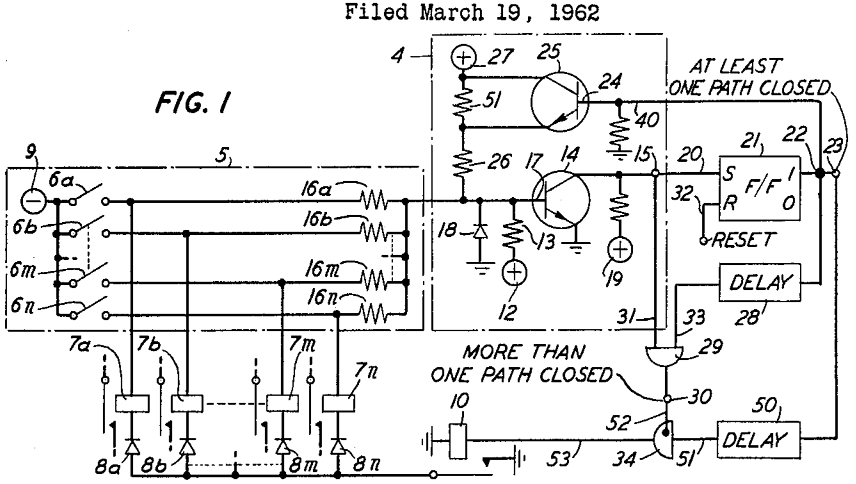
FIG. 1 shows a two-transistor checking circuit representative of one illustrative embodiment of the invention.

With referenge to FIG. 1, the paths in group 5 to be checked by the switching network 4, include a plurality of switches 6–, which are symbolic representations of the desired control equipment. Also indicated are a plurality of relays 7– and diodes 8–, the latter being connectable to ground through the make contact of relay 10. Source 12 normally controls the conductivity of transistor 14 through resistor 13. The outputs at terminal 15 will indicate the state of transistor 14: when transistor 14 is ON, terminal 15 is substantially at ground potential, and when transistor 14 is OFF, terminal 15 is at the potential dictated by the value of source 19. Negative potential source 9 can be connected through the available path and corresponding resistor 16– to the base 17 of the transistor 14, depending on the closure condition of the paths. The value of source 9 is such that it will reverse-bias transistor 14, thereby turning it off. The diode 18 acts as a safety feature in that it clamps the potential on base 17 to a maximum negative value corresponding to the voltage drop across the diode.

Flip-flop 21 is responsive on its "set" input 20 to the ON-OFF sequence of transistor 14, switching that flip-flop from the "0" state to the "1" state, resulting in an output indication at terminals 22 and 23. This output indication is fed back on lead 40 to the base 24 of transistor 25, which transistor is normally nonconductive. Source 27 can be connected to the base 17 of transistor 14 through resistor 26 when transistor 25 turns on. The circuit parameters and sources are so chosen as to permit the delivery of current from source 27 to the base 17 of transistor 14 to again effect a change of state in transistor 14 under the proper conditions of path closure. The output at terminal 22 will also be exhibited at input 33 to AND gate 29, after passing through delay unit 28 which may be of a conventional type, as may unit 50. The time delay provided by unit 28 is equal to or slightly greater than the sum of the switching times of transistors 14 and 25. Inhibit gate 34 will provide an output signal on lead 53 to operate relay 10 if, after the time delay of element 50 passes, an output signal appears on lead 51 while none appears on lead 52. Reset conductor 32 may be utilized to reset flip-flop 21 at the discretion of an automatic or manual control signal.

*One and Only One Path Completed*

If only a single one of the paths in group 5 is completed through the closure of a single one of the switches 6–, 6*a* for example, normally ON transistor 14 will initially be turned off, thereby causing flip-flop 21 to show an output at terminals 22 and 23. This output is both fed back to turn on normally OF transistor 25, and passed through delay unit 28 to input lead 33 of AND gate 29. Since it has been assumed that only a single path has been closed, the current supplied from source 27 through resistor 26 to the base 17 of transistor 14, after transistor 25 turns on is sufficient to turn on transistor 14, thereby terminating the output pulse that had been present at terminal 15. Since the delay unit 28 provides a delay equal to or slightly greater than the sum of the switching times of transistors 14 and 25, if only a single one of the paths in group 5 is completed, there will be no time at which both inputs to AND gate 29 are activated, so no output will appear at terminal 30. When only one of the paths in group 5 is completed, therefore, an output signal will appear at terminal 23, while no such signal will be present at terminal 30. Terminals 23 and 30 may be connected to suitable indicating devices (not shown) for providing external indications of the circuit operation.

When this condition occurs, the signal from flip-flop 21 will be transmitted through delay unit 50 on lead 51 to energize gate 34, and since no signal is present on lead 52, an output signal on conductor 53 will thereafter operate relay 10. The closing of the make contacts of relay 10 furnishes ground for the selected relay 7*a* to operate, thereby closing the corresponding contact and completing a circuit (not shown) through that contact.

*No Path Completed*

If none of the switches 6– close, it is apparent that transistor 14 will remain in its conductive state, maintained by potential source 12. Terminal 15 will therefore continuously be at ground potential and no input will be delivered to the set terminal of flip-flop 21, which will thereby remain in its "0" condition. Therefore, when no paths are completed, no output signals will be displayed at either terminal 23 or terminal 30, and relay 10 will not be operated.

*More Than One Path Completed*

The closure of more than one of the switches 6–, 6*a* and 6*b* for example, will operate to turn off normally ON transistor 14 as was the case when only a single path was completed. Similarly as above, flip-flop 21 will switch to its "1" condition by virtue of the value of source 19 to which terminal 15 will rise when transistor 14 turns off. The output of flip-flop 21 will be fed back from terminal 22 on lead 40 to turn on normally OFF transistor 25, and will also be delivered, after passage through the delay unit 28, to AND gate 29 on lead 33. The current supplied from source 27 through resistor 26 to the base 17 of transistor 14 when transistor 25 turns on is insufficient to turn on transistor 14 due to the inability of source 27 to overcome the reverse bias on transistor 14 provided by negative potential source 9 over resistances 16*a* and 16*b* in parallel. Transistor 14 will remain OFF, and consequently terminal 15 will continue to "see" the potential determined by the value of source 19.

It can thus be seen that the continued presence of a pulse or voltage level at terminal 15 will provide an input from terminal 15 on conductor 31 to AND gate 29; it will be recalled that the output of flip-flop 21 at terminal 22 is also present at the other input (lead 33) of AND gate 29 after having passed through delay unit 28. The presence of the two simultaneous inputs to AND gate 29 results in an output signal at terminal 30. Thus, when more than one of the paths in group 5 has been completed, outputs will be present at both terminals 23 and 30. Since the time delay provided by unit 50 is slightly greater than that of unit 28 (it may be greater than that of unit 28 by a small "waiting period" explained below with reference to FIG. 2, line C), an input signal will therefore appear on lead 52 in advance of the appearance of a signal on lead 51. Gate 34 is thereby inhibited from conducting, and no signal will be transmitted over conductor 53, leaving relay 10 unoperated.

Figure 2:
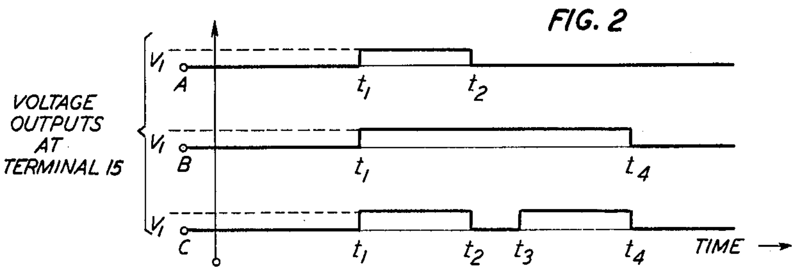
FIG. 2 is a graphical representation of the possible output conditions at a terminal of FIG. 1.

In FIG. 2, the signal output and time relationships at terminal 15 of FIG. 1 for the various conditions of path closure described above are indicated. FIG. 2, line A shows the signal condition at terminal 15 when only a single one of the paths in group 5 has been completed. At time $t_1$, after one path has been closed, transistor 14 turns off, thereby raising the potential at terminal 15 from ground to $V_1$, the value dictated substantially by source 19. Terminal 15 will continue to display this voltage level until time $t_2$, when transistor 14 again turns on as the result of current supplied from source 27 after transistor 25 has also turned on. Thus, at time $t_2$, terminal 15 returns to ground potential.

FIG. 2 lines B and C, are representations of the signal output and time relationships at terminal 15 under two alternative sequential conditions when more than a single one of the paths in group 5 of FIG. 1 have been completed. The first alternative, indicated in FIG. 2, line B, is that two or more of the switches 6– close at the same time. In response thereto, as noted above, at time $t_1$ terminal 15 will rise to the potential $V_1$ determined by source 19 and, since transistor 14 remains OFF, that terminal will remain at voltage level $V_1$, returning to ground at time $t_4$ following the opening of the paths, as a result of the opening of the two or more switches 6–.

If, on the other hand, as shown in FIG. 2, line C, two or more of the switches 6– close, but not precisely simultaneously, terminal 15 will initially rise to the potential $V_1$ of source 19 when a first path closes; at time $t_2$, however, the second switch not yet having operated, the turning on of transistor 25 will sequentially cause transistor 14 to again become conductive for the time between $t_2$ and $t_3$. Terminal 15 therefore will return to ground potential at time $t_2$. Flip-flop 21 will have switched to its "1" state, nevertheless, thereby maintaining a continuous input to AND gate 29 on lead 33, after the time delay provided by element 28 has passed. Shortly thereafter, however, when a second path closes, at time $t_3$ transistor 14 will again be turned off and terminal 15 will follow the same voltage changes as it had just previously; AND gate 29 will conduct under these conditions at time $t_3$. Finally, at time $t_4$, transistor 14 will be returned to its conductive state for the second time when the paths open, thereby returning terminal 15 to ground potential as indicated in FIG. 2, line C.

It is now evident that the element 50 must provide a slightly greater delay than that of unit 28, to cover the circuit's short "waiting period." This is a predetermined period of time, such as that shown between time $t_2$ and $t_3$ in FIG. 2, line C, during which the checking circuit will still be operative to detect the nonsimultaneous closing of two or more of the paths in group 5. If, as shown in FIG. 2, line C, a second path closes at time $t_3$, it is noted from FIG. 1 that AND gate 29 will be enabled, resulting in an output signal at terminal 30 and on inhibit conductor 52; at the same time, the output from terminal 23 will have been fully transmitted through delay unit 50 onto lead 51. However, no output signal will appear on lead 53, due to the presence of an inhibit signal on lead 52, noted supra.

Delay unit 50 provides this additional "waiting period" delay, since if only one path had been closed by time $t_2$, gate 34 would not otherwise be inhibited, and the signal on lead 51 would therefore be effective to pass through gate 34 and operate relay 10. The provision for the "waiting period" delay in element 50, however, permits AND gate 29 to still be enabled, as a result of the completion of a second path, before gate 34 receives the output signal from terminal 23. Gate 34 is thus properly inhibited and relay 10 will remain unoperated.

It will be noted that relay 10 includes an inherent delay in operation (by virtue of its inertia) which is relatively large in comparison to the delay provided by delay unit 28. In consequence, the delay provided by unit 50 may, under appropriate circumstances, be reduced to zero or eliminated.

Typical illustrative component and parameter values for FIG. 1 are as follows:

| | |
|---|---|
| Resistor 13 | 30.1 kilohms. |
| Resistors 16a–16n | 36.5 kilohms. |
| Resistor 26 | 10.1 kilohms. |
| Resistor 51 | 300 kilohms. |
| Potential source 9 | Minus 48 volts. |
| Potential source 12 | Plus 24 volts. |
| Potential source 19 | Plus 24 volts. |
| Potential source 27 | Plus 12 volts. |
| Delay unit 28 | 1 microsecond. |

Figure 3:
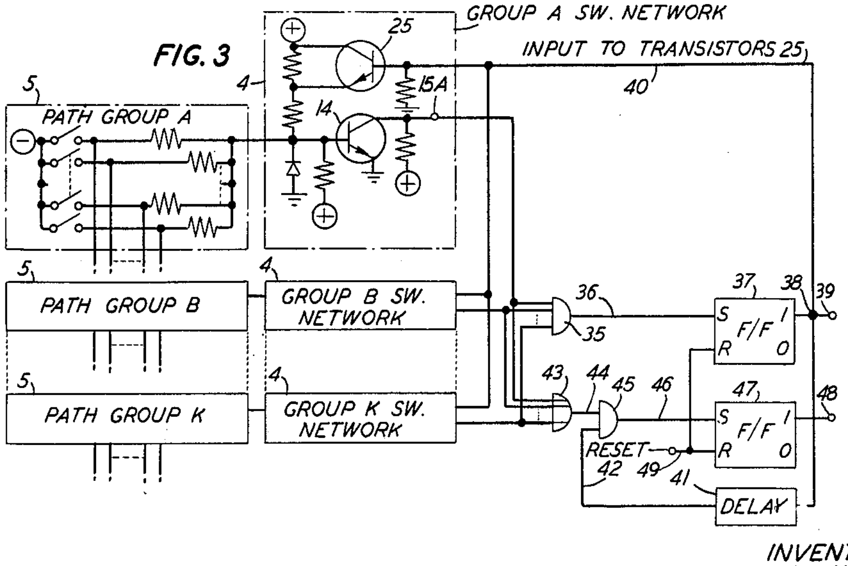
FIG. 3 shows combined checking circuits for providing an indication of the path availability of more than a single group of paths.

FIG. 3 illustrates an arrangement whereby several of the path of groups 5 of FIG. 1 may be checked by circuits including the switching network 4 of FIG. 1. This check is designed to determine whether or not one and only one path is closed in each of the path groups A through K in FIG. 3, utilizing the corresponding switching networks 4 for each of the groups. The group check operates as did the individual check circuit in FIG. 1, displaying an output pulse on each of the terminals 15– when at least one path is closed through each of the path groups. This output will be displayed when the transistors 14 of each of the networks 4 are turned off by the reverse-bias effect of the negative potential source 9 shown in FIG. 1. To facilitate the description and to simplify the drawing, only the circuitry for path group A and for the group A switching network is shown in detail. The remaining groups B through K are identically constituted.

The ouputs at the terminals 15– of each of the networks in FIG. 3 are transmitted to AND gate 35, which will deliver an output signal on lead 36 to set flip-flop 37 only if at least one of the switches 6– of FIG. 1 has closed in each group. When flip-flop 37 changes from its "0" to its "1" condition, the corresponding output will be exhibited at terminals 38 and 39. This output will be fed back from terminal 38 on lead 40 to the inputs to transistors 25 of each of the switching networks 4. If a single path through each of the groups A through K is closed, the effect of transistors 25 being turned on by the sequentially recycled signal on lead 40 will be to again turn on each of the transistors 14 in the switching networks. As discussed supra and as illustrated in FIG. 2, line A, this will terminate the output pulses at the terminals 15–. The "1" output from terminal 38 is also delivered through delay unit 41, which is identical to delay unit 28 of FIG. 1, to AND gate 45 along conductor 42. In order for this gate to be enabled, a signal is also needed on lead 44, the latter being the output from OR gate 43. However, assuming that only a single path through each of the groups A through K has closed, there will be no time at which both inputs 42 and 44 to AND gate 45 are energized. This is apparent from the fact that although the outputs at terminals 15– will be initially effective to energize OR gate 43 and result thereby in a "temporary" output on lead 44, the delay in unit 41 is such that by the time the output signal from flip-flop 37 passes through delay unit 41 from terminal 38, and arrives on lead 42, the output signals at each of the terminals 15– will have already terminated. Thus, no simultaneous input signals on leads 42 and 44 will occur, and AND gate 45 will remain de-energized. The result of having only a single path in each of the path groups energized is therefore an output signal on terminal 39 with no corresponding signal on terminal 48.

Should at least one path be closed in each of the groups A through K, but more than one path be closed in at least one of these groups, group B for example, the corresponding checking circuits will operate initially as above to set flip-flop 37 to its "1" condition, thereby resulting in an output signal at terminals 38 and 39; this will be followed by the delivery of this signal on lead 40 to the inputs of each of the transistors 25 of the networks 4.

Since it has been assumed that group B has more than one path closed, the turning on of each of the transistors 25 of the switching networks will not be operative to turn on transistor 14 of the group B network. Instead, this transistor 14 will remain OFF, thereby maintaining corresponding terminal 15B (not shown) of that switching network at the level $V_1$ shown in FIG. 2 (line B for the general case) and determined by the value of potential source 19 in FIG. 1. Therefore, since this output level is transmitted to OR gate 43, as well as to AND gate 35, there will be an output signal on conductor 44 at the time of the arrival of the output signal from terminal 38 passing through delay unit 41 to input lead 42 of AND gate 45. When the time delay determined by unit 41 passes, gate 45 then conducts. The resultant output on lead 46 will set flip-flop 47, thereby displaying an output signal on that flip-flop's terminal 48. It can therefore be seen that when at least one path is closed through each of the groups A through K, but more than one path is closed in any one of these groups, output signals will be displayed on both terminals 39 and 48.

Finally, if at least one of the groups A through K had no paths closed through it, it is apparent that AND gate 35 would not conduct, and no output signals would be displayed on either terminal 39 or 48. Suitably responsive indicating apparatus (not shown) may be connected to terminals 39 and 48 to yield external indications of the circuit operation.

The operation of the circuit of FIG. 3 is summarized in the following table:

| | Output Signals At Terminals 39 and 48 | Condition of Path Group Closure |
|---|---|---|
| Case I | No signals at either terminal. | At least one of groups A through K has no paths closed. |
| Case II | Signal at terminal 39, no signal at terminal 48. | One and only one path is closed through each of the groups A through K. |
| Case III | Signals at both terminals 39 and 48. | One path closed in each of the groups A through K with at least one such group having more than one path closed. |

The reset conductor 49 is utilized in a manner similar to that of lead 32 in FIG. 1; that is, it is adapted to reset both of flip-flops 37 and 47 at any time after the checking operation is completed.

It is understood that the above-described embodiments are merely applications of the principles of this invention, and numerous variations can be made by those skilled in the art employing these principles without departing from the spirit and scope of this invention.

What is claimed is:

1. A checking circuit comprising first and second switching means, potential means, a plurality of conductive paths, feedback means coupling said first switching means to said second switching means, means for connecting said paths from said potential means to said first switching means to operate said first switching means to a first condition if the number of said paths connected is equal to or exceeds a predetermined number, and means including said feedback means for energizing said second switching means to thereafter sequentially operate said first switching means to a second condition only if said predetermined number of said paths is connected to said first switching means.

2. A checking circuit in accordance with claim 1 including additional potential means, wherein said first and second switching means include respectively first and second transistors, each of said transistors having base, emitter and collector electrodes, said base of said first transistor being connectable to said plurality of conductive paths, a source of reference potential, said emitter of said first transistor being connected to said reference potential, said feedback means coupling said collector of said first transistor to said base of said second transistor, said collector of said second transistor being connected to one of said additional potential means, and said emitter of said second transistor being connected to said base of said first transistor.

3. A checking circuit in accordance with claim 1, wherein said feedback means includes bistable switching means.

4. A checking circuit comprising a plurality of groups of conductive paths to be checked, checking means connected to each of said groups, gating means, said checking circuits being connected to said gating means, first and second bistable switching means coupled to said gating means, said first bistable switching means being responsive to signals from said gating means to sequentially energize said checking means to a condition representative of a predetermined number of said paths in each of said groups being closed, said first and second bistable switching means including additional means responsive to signals from said gating means to provide an indication of the closure condition of said paths.

5. A checking circuit in accordance with claim 4 wherein said gating means includes first means responsive to signals from all of said checking means to set said first bistable switching means to a first condition, and second means responsive to signals from one or more of said checking means, and third means responsive to simultaneous signals from said first bistable switching means and from said second means, said third means being operative to set said second bistable switching means to said first condition if more than said predetermined number of said paths are closed in each of said groups.

6. A checking circuit comprising a plurality of conductive paths to be checked, time-sequenced checking means connectable to said paths, bistable switching means connected to said checking means and operative to indicate if at least a predetermined number of said paths has closed, first relay means, first and second gating means, said second gating means being operative to energize said relay means if said predetermined number of said paths have closed, said first gating means coupling said checking means to said second gating means, first and second time delay means, said second time delay means exceeding said first time delay means by a predetermined period, said first time delay means connecting said bistable switching means to said first gating means, and said second time delay means being connected between said bistable switching means and said second gating means.

7. A checking circuit in accordance with claim 6, including a plurality of unidirectional current means and additional relay means, wherein each of said additional relay means is individually connected to a corresponding one of said conductive paths, and said second gating means includes means operative to govern said first relay means to energize said additional relay means through said unidirectional current means if said predetermined number of said conductive paths is energized.

8. A checking circuit in accordance with claim 6 wherein said time-sequenced checking means includes first and second switching means, at least one input and one output terminal, a plurality of potential sources, unidirectional current means connected to said first switching means to limit signals from said input terminal to said first switching means, one of said potential sources being connected to said first switching means and operative to normally maintain said first switching means in a first condition, said first switching means being responsive to signals at said input terminal from said paths to change to a second condition and deliver a signal to said output terminal; said bistable switching means being responsive to signals at said output terminal to sequentially operate said second switching means to said first condition, and means to sequentially deliver a signal to return said first switching means to said first condition if said predetermined number of said paths are closed.

9. A checking circuit comprising time-sequenced checking means, a plurality of conductive paths to be checked, said paths being connected to said checking means, first and second time delay means, first and second gating means, and bistable switching means responsive to signals from said checking means to deliver a signal through said second time delay means to said second gating means if at least a predetermined number of said paths is closed, said first time delay means coupling said bistable switching means to said first gating means, said checking means including switching means operative to energize said first gating means if more than said predetermined number of said paths are closed.

10. A checking circuit for determining the presence of current on only one of a number of conductive paths comprising a plurality of conductive paths, a first transistor, each of said paths being connected in parallel to the base of said first transistor, means for normally biasing said first transistor in a first conduction state such that current flow on any of said paths causes said first transistor to assume a second conduction state, a second transistor, means for causing said second transistor to change its conduction state on said first transistor assuming said second conduction state, means connecting said second transistor to said first transistor base to cause current to flow to said base sufficient to balance the current from only one of said conductive paths, and sequential means connected to the output of said first transistor and responsive to the change of said first transistor from said first to second conductive states and back to said first conductive state to indicate the presence of current on one and only one of said conductive paths.

11. A checking circuit in accordance with claim 10 wherein said sequential means includes storage means responsive to said first transistor changing to said second conduction state and delay means whereby the non-simultaneous presence of currents on said paths may also be checked.

No references cited.